US010922068B1

(12) United States Patent
Radjabi et al.

(10) Patent No.: US 10,922,068 B1
(45) Date of Patent: Feb. 16, 2021

(54) UPDATING FIRMWARE FOR PROGRAMMABLE INTEGRATED CIRCUITS IN COMPUTING ENVIRONMENTS

(71) Applicant: Xilinx, Inc., San Jose, CA (US)

(72) Inventors: Ryan F. Radjabi, Campbell, CA (US); Hem C. Neema, San Jose, CA (US); Sonal Santan, San Jose, CA (US); Yenpang Lin, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 64 days.

(21) Appl. No.: 16/186,204

(22) Filed: Nov. 9, 2018

(51) Int. Cl.
*G06F 9/44* (2018.01)
*G06F 8/65* (2018.01)
*G06F 13/42* (2006.01)

(52) U.S. Cl.
CPC ............ *G06F 8/65* (2013.01); *G06F 13/4221* (2013.01); *G06F 2213/0026* (2013.01)

(58) Field of Classification Search
CPC ..... G06F 8/65; G06F 8/71; G06F 8/30; G06F 13/4221; G06F 8/61; G06F 13/4234; G06Q 10/101
USPC .................................................. 717/168–178
See application file for complete search history.

(56) References Cited

U.S. PATENT DOCUMENTS

| | | | | |
|---|---|---|---|---|
| 5,708,849 A * | 1/1998 | Coke | ........................ | G06F 13/28 710/22 |
| 6,889,340 B1 * | 5/2005 | Bramley, Jr. | ....... | G06F 11/2284 714/30 |
| 6,901,505 B2 * | 5/2005 | McGrath | ............. | G06F 9/30032 712/225 |
| 6,952,409 B2 * | 10/2005 | Jolitz | ...................... | H04L 29/06 370/328 |
| 7,904,895 B1 * | 3/2011 | Cassapakis | ............. | G06F 8/654 717/168 |
| 8,145,894 B1 * | 3/2012 | Casselman | .......... | G06F 15/7871 713/100 |
| 8,473,715 B2 * | 6/2013 | Stillwell, Jr. | ....... | G06F 15/7867 712/15 |

(Continued)

OTHER PUBLICATIONS

Title: Firmware upgrade in xTCA systems autho rD Makowski, et al, published 2013.*

(Continued)

*Primary Examiner* — Chameli Das
(74) *Attorney, Agent, or Firm* — Kevin T. Cuenot (57) ABSTRACT

Updating firmware in an programmable integrated circuit (IC) includes determining, using a processor of a computer, a base address register (BAR) of an accelerator card from a device data file, wherein the accelerator card includes a programmable IC and is connected to the computer via a communication bus, mapping, using the processor, a feature PROM and a flash programmer circuit of the programmable IC to local memory of the computer using the BAR, and reading, over the communication bus, the feature PROM on the programmable IC to determine a programming mode for programming an external flash memory coupled to the flash programmer circuit. Based on the programming mode and using the processor, firmware is provided to the flash programmer circuit on the programmable IC via the communication bus. The flash programmer circuit is configured to program the firmware into the external flash memory.

16 Claims, 4 Drawing Sheets

(56) References Cited

U.S. PATENT DOCUMENTS

| | | | | |
|---|---|---|---|---|
| 8,601,203 | B2* | 12/2013 | Holbrook | G06F 13/4022 |
| | | | | 711/103 |
| 10,282,192 | B1* | 5/2019 | Ayoub | G06F 13/4282 |
| 2007/0169059 | A1* | 7/2007 | Halambi | G06F 8/4452 |
| | | | | 717/160 |
| 2010/0113092 | A1* | 5/2010 | Mitchell | G06F 1/1632 |
| | | | | 455/556.1 |
| 2017/0161054 | A1* | 6/2017 | Albot | G06F 12/109 |
| 2018/0107472 | A1* | 4/2018 | Albot | G06F 12/109 |
| 2020/0081850 | A1* | 3/2020 | Singh | G06F 13/28 |
| 2020/0310993 | A1* | 10/2020 | Kumar | G06F 12/122 |

OTHER PUBLICATIONS

Title: Secure firmware validation and update for consumer devices in home networking author: BC Choi published on 2016.*

* cited by examiner

Determine a base address register (BAR) of an accelerator card from a device data file
302

Map feature programmable read only memory (PROM) and flash programmer circuit, both implemented within the programmable IC, to local memory of the host computer system using the BAR
304

Read, over the communication bus, the feature PROM on the programmable IC to determine a programming mode for programming an external flash memory coupled to the flash programmer circuit
306

Provide, based on the programming mode, firmware to the flash programmer on the programmable IC via the communication bus
308

Flash programmer programs the firmware into external flash memory using the programming mode
310

UPDATING FIRMWARE FOR PROGRAMMABLE INTEGRATED CIRCUITS IN COMPUTING ENVIRONMENTS

TECHNICAL FIELD

This disclosure relates to integrated circuits (ICs) and, more particularly, to updating firmware for programmable ICs within computing environments.

BACKGROUND

Within modern computing environments, programmable integrated circuits (ICs) can be incorporated into a computer, e.g., a server, and used for hardware acceleration. In the case of programmable ICs, e.g., field programmable gate arrays (FPGAs), hardware acceleration refers to implementing program code or an application in hardware using the programmable circuitry of the programmable IC. Hardware acceleration may provide a variety of benefits such as faster operation, reduced power consumption, redundancy, etc. Despite the fact that implementing an application as hardware provides benefits that may or may not include faster operation, the implementation of program code and/or an application in hardware is typically referred to as "hardware acceleration."

The programmable ICs are coupled to a circuit board that includes additional resources supporting operation of the programmable IC. For example, the circuit board can also have random access memory and flash memory. Typically, the flash memory stores firmware for the programmable IC. The circuit board can be coupled to the computer through a communication bus. The circuit board is also referred to as an accelerator card or board.

Presently, updating the firmware for a programmable IC may be performed in several different ways. One way is to physically attach a cable to a Joint Test Action Group (JTAG) port on the accelerator card and then update the firmware. In larger scale computing environments such as data centers and/or cloud computing environments, this type of manual updating is impractical in view of the large number of computers and programmable ICs that may be used.

Another technique requires that the computer execute an electronic design automation (EDA) application and suitable drivers intended for use with a particular accelerator card. In such cases, the particular version of the EDA application and driver must be compatible with the particular accelerator card, particular programmable IC thereon, particular firmware already used in the programmable IC, as well as the particular version of firmware that the programmable IC is to be upgraded. Ensuring that each computer has the correct version of the EDA application and drivers can be difficult in view of the number of computers (e.g., servers) in the computing environment. Moreover, a single computer may include multiple different versions of accelerator cards each running different versions of the firmware. In many cases the particular version of firmware running on the accelerator card is unknown, which makes updating the firmware using a suitable EDA application and drivers impractical.

SUMMARY

In one or more embodiments, a method can include determining, using a processor of a computer, a base address register of an accelerator card from a device data file, wherein the accelerator card includes a programmable integrated circuit and is connected to the computer via a communication bus, mapping, using the processor, a feature programmable read only memory (PROM) and a flash programmer circuit, both implemented within the programmable integrated circuit, to local memory of the computer using the base address register, reading, using the processor and over the communication bus, the feature PROM on the programmable integrated circuit to determine a programming mode for programming an external flash memory coupled to the flash programmer circuit, and providing, based on the programming mode and using the processor, firmware to the flash programmer circuit on the programmable integrated circuit via the communication bus. The flash programmer circuit can be configured to program the firmware into the external flash memory.

In one or more embodiments, a system includes a processor configured to initiate operations. The operations can include determining a base address register of an accelerator card from a device data file, wherein the accelerator card includes a programmable integrated circuit, mapping a feature PROM and a flash programmer circuit, both implemented within the programmable integrated circuit, on a communication bus using the base address register, reading, over the communication bus, the feature PROM on the programmable integrated circuit to determine a programming mode for programming an external flash memory coupled to the flash programmer circuit, and providing, based on the programming mode, firmware to the flash programmer circuit on the programmable integrated circuit via the communication bus. The flash programmer circuit can be configured to program the firmware into the external flash memory.

In one or more embodiments, an integrated circuit includes a feature PROM configured to store a programming mode for writing firmware to an external flash memory and a flash programmer circuit configured to receive the firmware from a computer and write the firmware to the external flash memory.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to updating firmware of programmable ICs within computing environments. In accordance with the inventive arrangements described within this disclosure, methods and systems are provided for updating firmware within programmable ICs. Within modern computing environments, programmable ICs can be incorporated into computers for hardware acceleration. The programmable ICs are coupled to a circuit board, e.g., an accelerator card, that also includes additional resources supporting operation of the programmable IC such as flash memory, random-access memory (RAM), and the like. Since firmware for the programmable IC is stored within the programmable IC itself in volatile memory, a backup of the firmware is stored in non-volatile memory, e.g., in the flash memory of the accelerator card. Accordingly, the firmware can be reloaded into the programmable IC from the non-volatile memory at startup, after restarting, power cycling, or the like.

In order to update the firmware of the programmable IC, updated or new firmware is written to the flash memory on the accelerator card. From time-to-time within this disclosure, the phases "firmware of/for the programmable IC" and "firmware of/for the accelerator card" are used interchangeably. Accordingly, the next time the programmable IC loads the firmware from the flash memory, the firmware in the programmable IC is effectively updated.

The firmware of the programmable IC can include a configuration bitstream that specifies a platform for the programmable IC. The term "platform" means circuits and/or systems implemented in the programmable circuitry of the programmable IC that support operation of the programmable IC on the accelerator card, operation of the programmable IC and/or accelerator card in the computer, and/or support operation of user designs within the programmable IC. The platform is implemented in what is often referred to as a static region of the programmable circuitry. For example, the platform can include a bus endpoint that is capable of communicating over a communication bus with the host computing system, a memory controller for communicating with RAM, and other resources that can also be used by user circuit designs.

Upon startup of the programmable IC, the firmware from the flash memory is loaded into the programmable IC thereby implementing the platform therein. With the platform implemented in a static region of the programmable circuitry, the programmable IC is capable of registering and/or communicating with the computer on the communication bus such that the processor of the computer is able to "see" the programmable IC. In addition, the programmable IC is ready to accept further configuration data, e.g., one or more partial configuration bitstreams, that specifies a user application and/or circuit design. The further configuration data can be provided from the computer and loaded into the programmable IC thereby implementing the user application and/or circuit design within a dynamically reconfigurable region of the programmable circuitry of the programmable IC.

In one or more embodiments, the platform implemented within the programmable IC includes one or more additional circuits. These circuits can include a feature programmable read only memory (PROM) and a flash programmer circuit. The computer is capable of updating firmware of the accelerator card by exposing addresses of the feature PROM and the flash programmer circuit within the programmable IC to an application executing in the user space of the computer. The application is capable of reading from the feature PROM and writing to the flash programmer circuit over the communication bus by reading and/or writing to local memory that is mapped to the addresses of the respective circuits.

By mapping the circuit addresses into the user space application, the application is capable of providing firmware to the flash programmer circuit, which in turn writes the firmware to the flash memory on the circuit board. Moreover, the application is capable of updating the firmware without loading and/or installing drivers for the accelerator card or for the programmable IC. As such, the computer is capable of updating firmware without executing an electronic design automation (EDA) application or a driver for the accelerator card or programmable IC, without regard for the particular version of firmware currently running in the programmable IC, and without regard for the particular version of firmware to which the programmable IC is being upgraded.

The computer is capable of updating the firmware in the programmable IC by leveraging the existing communication bus over which the computer typically communicates with the programmable IC. Updating firmware over the communication bus as described herein provides a faster and more efficient update process than conventional techniques for updating programmable IC firmware. As this process is performed repeatedly in large scale computing environments, the speed and efficiency of the firmware update embodiments described herein realized many times over.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
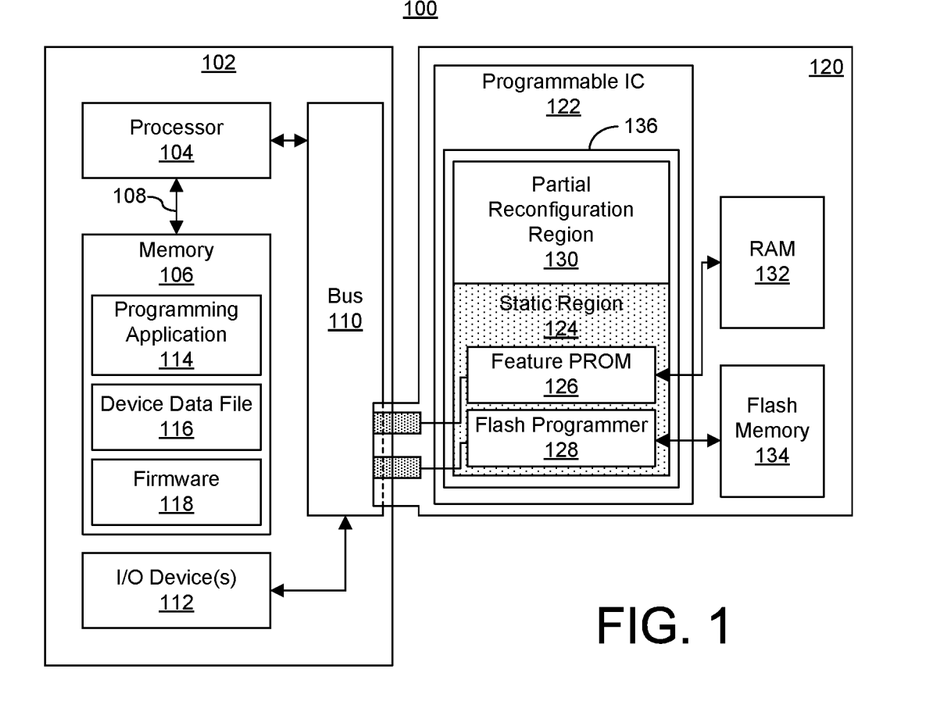
FIG. 1 illustrates a data processing system in accordance with the principles of the disclosure.

FIG. 1 illustrates an example data processing system (system) 100 for use with one or more embodiments described herein. System 100 is an example of computer hardware that may be used to implement a computer, a server, a portable computer such as a laptop or a tablet computer, or the like. A system or device implemented using computer hardware is capable of performing the various operations described herein relating to processing a circuit design for implementation within an IC.

In one or more embodiments, system 100 may be included within a larger, distributed computing system. Examples of such distributed computing systems include, but are not limited to, hyperscale computing systems and cloud computing systems. A hyperscale computing system is a computing system that has a distributed infrastructure that can quickly accommodate an increased demand for internet-facing and back-end computing resources without requiring additional physical space, cooling or electrical power.

Hyperscale computing is characterized by standardization, automation, redundancy, high performance computing (HPC), and high availability (HA).

Cloud computing refers to a computing model that facilitates convenient, on-demand network access to a shared pool of configurable computing resources such as networks, servers, storage, applications, and/or services. These computing resources may be rapidly provisioned and released with minimal management effort or service provider interaction. Cloud computing promotes availability and may be characterized by on-demand self-service, broad network access, resource pooling, rapid elasticity, and measured service. Cloud computing generally supports service models such as Cloud Software as a Service (SaaS), Cloud Platform as a Service (PaaS), and/or Cloud Infrastructure as a Service (IaaS). Cloud computing further may support deployment models such as Private cloud, Community cloud, Public cloud, and/or Hybrid cloud. Further information relating to cloud computing may be obtained from the National Institute of Standards and Technology (NIST) and, more particularly, the Information Technology Laboratory of NIST.

In the example of FIG. 1, system 100 includes a computer 102 and an accelerator board 120. Computer 102 is sometimes referred to as a "host computer system." Computer 102 includes at least one processor 104, a memory 106, a communication bus 110, and one or more input/output (I/O) devices 112. Processor 104 is coupled to memory 106 via a memory interface 108. Processor 104 and I/O devices 110 are coupled to communication bus 110. Computer 102 is capable of storing computer readable instructions (also referred to as "program code") within memory 106. Memory 106 is an example of computer readable storage media. Processor 104 is capable of executing the program code accessed from memory 106 via the memory interface 108.

Memory 106 includes one or more physical memory devices such as, for example, a local memory and a bulk storage device. Local memory refers to non-persistent memory device(s) generally used during actual execution of program code. Examples of local memory include RAM and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, or other suitable non-volatile memory device. In particular embodiments, computer 102 includes one or more cache memories (not shown) that provide temporary storage of at least some program code to reduce the number of times program code must be retrieved from a bulk storage device during execution.

In one or more embodiments, communication bus 110 is implemented as a Peripheral Component Interconnect Express (PCIe) bus. It should be appreciated, however, that PCIe is provided for purposes of illustration and not limitation as other suitable communication bus architectures can be used. I/O devices 112 can be coupled to computer 102, e.g., communication bus 110, either directly or through intervening I/O controllers. Examples of I/O devices 112 include, but are not limited to, a keyboard, a display device, a pointing device, one or more communication ports, and a network adapter. A network adapter refers to circuitry that enables computer 102 to become coupled to other systems, computer systems, remote printers, and/or remote storage devices through intervening private or public networks. Modems, cable modems, Ethernet cards, and wireless transceivers are examples of different types of network adapters that may be used with computer 102.

Memory 106 is capable of storing program code and/or data. Memory 106 is capable of storing an operating system (not shown) that is executed by processor 104. In one or more embodiments, the operating system is Linux. It should be appreciated that Linux is provided for purposes of illustration and not limitation. Other suitable operating systems can also be used. Memory 106 also stores a programming application 114 that is executed by processor 104, a device data file 116, and firmware 118. In one or more embodiments, the program code and/or data stored in memory 106 is considered an integrated part of computer 102. Further, it should be appreciated that any data used, generated, and/or operated upon by computer 102 (e.g., processor 104) are functional data structures that impart functionality when employed as part of computer 102.

Programming application 114 executes in the user space. In particular embodiments, programming application 114 includes a region of local memory that is mapped onto addresses of programmable IC 122 over communication bus 110. In one or more embodiments, programming application 114 is implemented as a Linux shell program. The particular implementation of programming application 114, however, is not intended to be limited to the particular example provided.

Device data file 114 includes information about kernel subsystems and/or hardware devices and associated device drivers of and/or coupled to computer 102. In the example of FIG. 1, device data file 116 specifies information about accelerator card 120. Device data file 116, for example, specifies a Base Address Register (BAR) for programmable IC 122 on communication bus 110. As an illustrative and nonlimiting example, in a Linux computing environment (e.g., a Linux operating system), device data file 116 is implemented using sysfs. The Linux kernel provides sysfs as a pseudo file system capable of exporting information (e.g., making information available) from the device model of the kernel (e.g., in the kernels space) to the user space through one or more virtual files. It should be appreciated that sysfs is provided for purposes of illustration and not limitation and that other technologies for providing a BAR of programmable IC 122 may be used, for example, as can be available from other operating systems.

Firmware 118 specifies a platform for programmable IC 122. Firmware 118 can be stored in any of a variety of different file types. Example file types can include, but are not limited to, an MCS file, an EXO file, or an ISC file. For example, firmware 118 can be a configuration bitstream and/or a partial configuration bitstream that specifies a platform that can be implemented in programmable IC 122.

Acceleration card 120 can include programmable IC 122, RAM 132, and flash memory 134. Programmable IC 122 is capable of performing a process called partial reconfiguration. Partial reconfiguration is a process where a region of programmable circuitry within a programmable IC referred to as a partial reconfiguration region can be dynamically reconfigured by loading a partial configuration bitstream into the programmable IC. The partial configuration bitstream can specify different circuitry than was previously implemented in the partial reconfiguration region. The partial configuration bitstream does not specify new and/or different circuitry for portions of the programmable circuitry outside of the partial reconfiguration region.

The partial reconfiguration region can undergo modification through partial reconfiguration, e.g., the loading of a partial configuration bitstream for the partial reconfiguration region, repeatedly where different partial configuration bitstreams specify different circuitry, while the other regions of the programmable circuitry of the programmable IC referred to as "static circuitry" or "static regions" continue to operate without interruption. The platform, which is specified by the firmware and implemented in the static region, can remain unchanged or constant throughout partial reconfiguration, thereby allowing the programmable IC to remain in communication with a host computer system while loading different user circuit designs therein.

In the example of FIG. 1, programmable circuitry 136 includes a partial reconfiguration region 130 and a static region 124. Partial reconfiguration region 130 can be used to implement different user circuit designs over time under control of computer 102, while static region 124 can remain unchanged and operable during the partial reconfiguration process. Static region 124, for example, includes the platform that allows programmable IC 122 to interact with computer 102, RAM 132, and/or flash memory 134 and continue to do so during the partial reconfiguration process. For example, static region 124 can include a memory controller (not shown) coupled to RAM 132 and a bus endpoint (not shown) coupled to communication bus 110. The memory controller and bus endpoint can be used by the user circuit designs implemented in partial reconfiguration region 130.

In the example of FIG. 1, static region 124 also includes a feature PROM 126 and a flash programmer circuit 128. Feature PROM 126 is capable of storing information describing accelerator card 120. In one or more embodiments, feature PROM 126 is capable of storing a programming mode that is to be used to program flash memory 134 and to provide data to flash programmer circuit 128. Flash programmer circuit 128 is capable of providing data to flash memory 134. Flash memory 134 is also referred to here as an external flash memory being separate from programmable IC 122.

In operation, processor 104 is capable of initiating a process to update firmware of programmable IC 122. In one or more embodiments, processor 104 is capable of executing programming application 114. In executing programming application 114, processor 104 accesses device data file 116 to determine a BAR of programmable IC 122 on communication bus 110. Programming application 114 can be preprogrammed with offsets from the BAR for feature PROM 126 and flash programmer 128. The offsets, for example, may be constant for different models of programmable ICs from the same manufacturer and across different models of accelerator cards. Accordingly, processor 104 is capable of mapping addresses corresponding to feature PROM 126 and flash programmer circuit 128 to a region of local memory in user space within memory 106.

Having mapped addresses a feature PROM 126 and flash programmer circuit 128 to local memory, processor 104 is capable of reading feature PROM 126 to determine the particular programming mode to be used in updating firmware for programmable IC 122. Processor 104 is further capable of providing firmware 118 to flash programmer 128 via communication bus 110 by writing to the memory locations in the mapped local memory corresponding to an input buffer of flash programmer 128.

System 100 may include fewer components than shown or additional components not illustrated in FIG. 1 depending upon the particular type of system that is implemented. In addition, the particular operating system, application(s), and/or I/O devices included may vary based upon system type. Further, one or more of the illustrative components may be incorporated into, or otherwise form a portion of, another component. For example, a processor can include at least some memory. System 100 can be used to implement a single computer or a plurality of networked or interconnected computers each implemented using the architecture of FIG. 1 or an architecture similar thereto.

Figure 2:
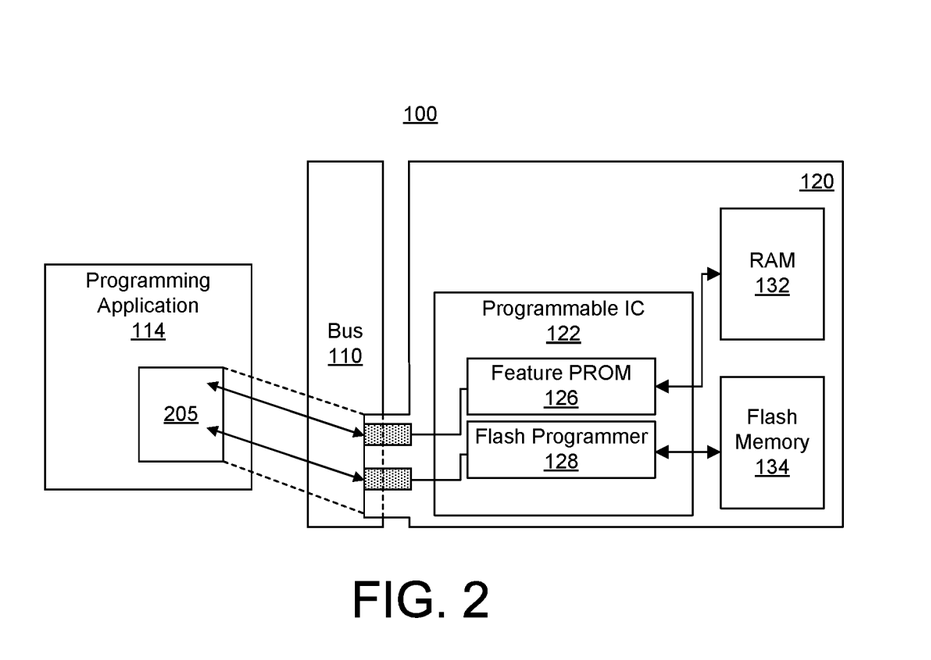
FIG. 2 illustrates a simplified version of the system of FIG. 1 in accordance with the principles of the disclosure.

FIG. 2 illustrates a simplified version of system 100 in accordance with the principles of the disclosure. In the example of FIG. 2, system 100 is shown where the addresses of feature PROM 126 and flash programmer 128 are mapped to a region 205 of local memory. As discussed, programming application 114 executes in the user space. Region 205 can be included in a data portion of programming application 114 and can be generated based on the BAR for programmable IC 122 read from device data file 116.

Figure 3:
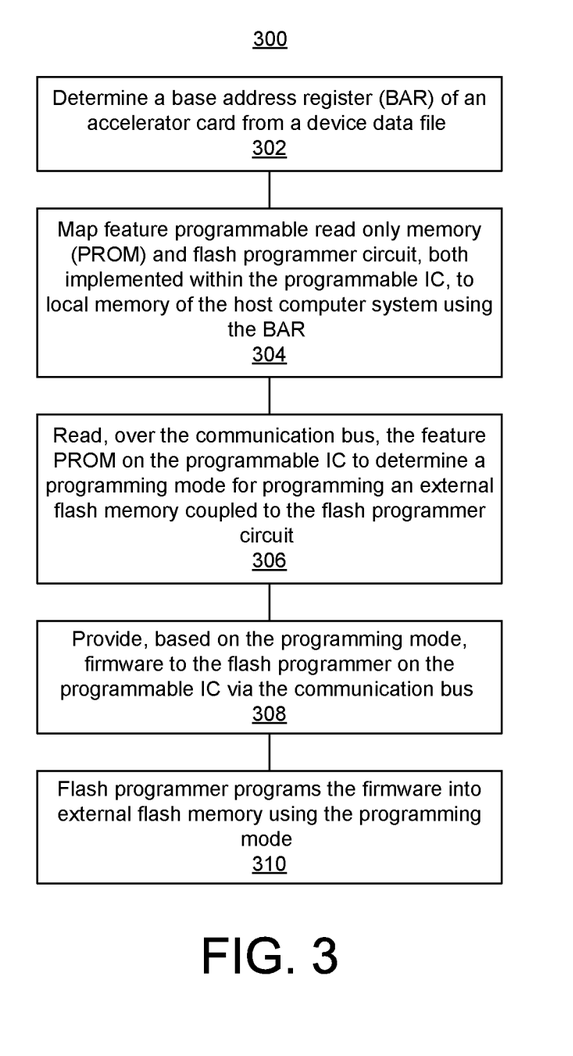
FIG. 3 illustrates a method of updating firmware in a programmable integrated circuit (IC) in accordance with the principles of the disclosure.

FIG. 3 illustrates a method 300 of updating firmware in a programmable IC in accordance with the principles of the disclosure. Method 300 can be implemented by a system as generally described in connection with FIGS. 1 and 2.

In block 302, the processor of the computer determines a BAR of an accelerator card (e.g., of the programmable IC on the accelerator card) from a device data file in the computer. The accelerator card includes a programmable IC and is connected to the computer via a communication bus. In block 304, the processor maps addresses of a feature PROM and a flash programmer circuit, both implemented within the programmable IC, to local memory of the computer using the BAR. In block 306, the processor reads, over the communication bus, the feature PROM on the programmable IC to determine a programming mode for programming an external flash memory coupled to the flash programmer circuit. In block 308, the processor provides, based on the programming mode, firmware to the flash programmer on the programmable IC via the communication bus.

In block 310, the flash programmer circuit programs the firmware into the external flash memory. The flash programmer circuit uses the programming mode to program the flash memory. Subsequent to storing the firmware into the external flash memory, the programmable IC is power cycled, reset, or otherwise restarted thereby causing the newly stored firmware in the external flash memory to be loaded into the programmable IC. Loading the firmware into the programmable IC completes updating of the firmware (e.g., the platform) within the programmable IC. For example, loading the firmware into the programmable IC updates and/or implements new circuits within programmable circuitry of the programmable IC. In one or more embodiments, the programmable IC has an architecture the same as or similar to the architecture described in connection with FIG. 5.

Figure 4:
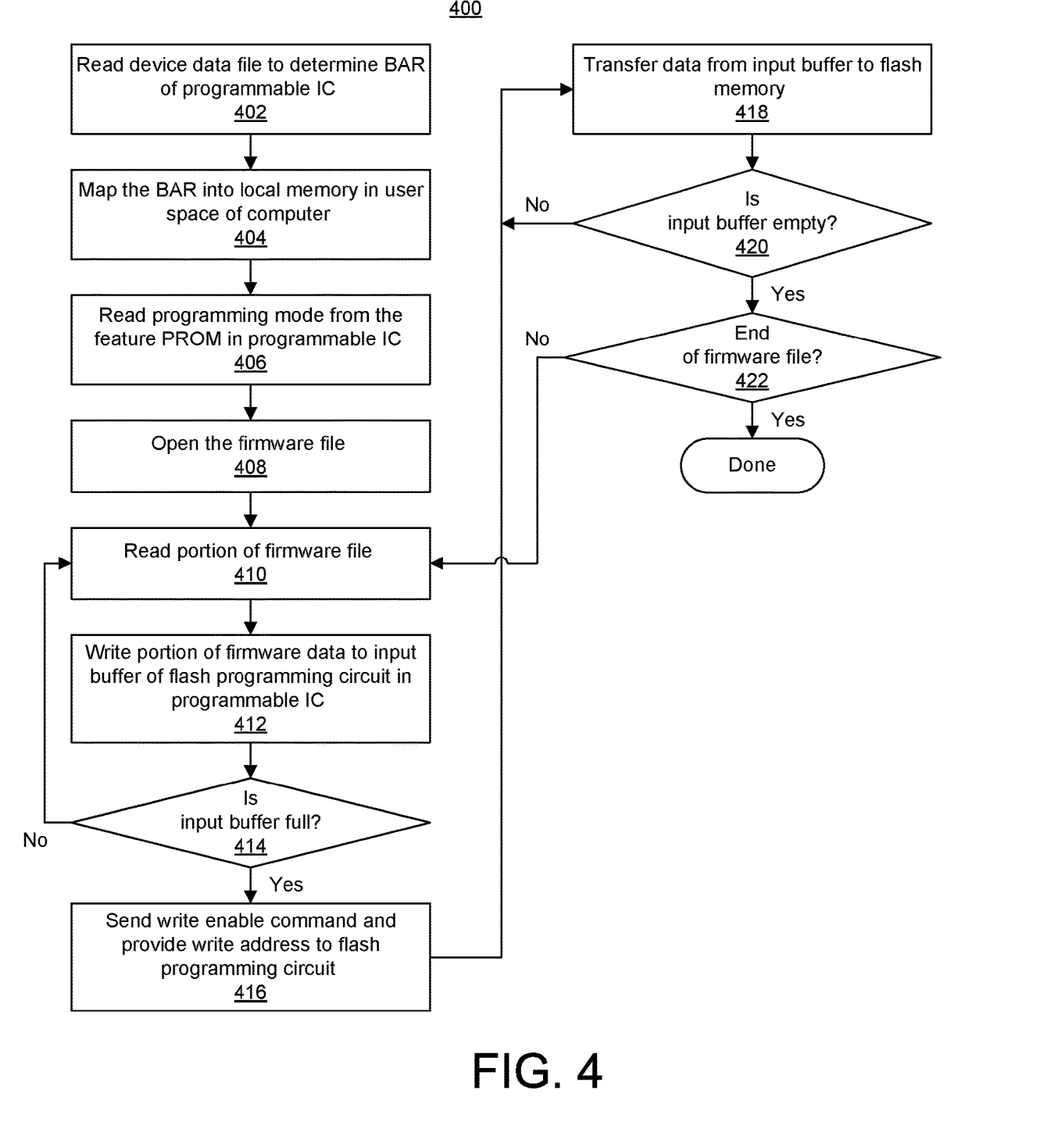
FIG. 4 illustrates another method of updating firmware in a programmable IC in accordance with the principles of the disclosure.

FIG. 4 illustrates another method 400 of updating firmware in a programmable IC in accordance with the principles of the disclosure. Method 400 can be implemented by a system such as system 100 as described in connection with FIGS. 1 and 2.

In block 402, the processor of the computer reads the device data file to determine the BAR of the programmable IC on an accelerator card connected to a communication bus of the computer. In particular embodiments, the device data file is implemented using sysfs.

In block 404, the processor maps the BAR into local memory and the user space of the computer. For example, the processor is capable of mapping the BAR into a region of local memory for an application, e.g., the programming application, that is configured to access the programmable IC. The application is capable of accessing the programmable IC directly using the BAR and predetermined offsets for selected circuits implemented within the programmable IC and, as such, does not need or utilize drivers to do so.

In one or more embodiments, the processor maps the BAR by calling "mmap." Calling mmap creates new virtual memory mapping for the calling process. The processor is then capable of accessing the virtual memory address to access the mapped physical address, which in this example corresponds to addresses of the feature PROM and/or the flash programmer circuit in the programmable IC. By reading the device data file and performing the mapping described, the processor is capable of exposing the BAR of the programmable IC, initially specified in the kernel space, and exposing the BAR to the user space so that the programming application is capable of accessing and/or using the BAR. Moreover, the programming application is capable of accessing the programmable IC without any specialized drivers or other software for the programmable IC and/or accelerator card.

The techniques described herein alleviate the need to match software/driver versions in the computer with firmware versions for the programmable IC. In addition, mapping described means that the programmer application does not need to utilize ioctl calls to communicate with the kernel space.

In block 406, the processor reads the programming mode from the feature PROM in the programmable IC. For example, in executing the programming application, the processor is capable of directly accessing the feature PROM in the programmable IC and reading a programming mode directly therefrom over the communication bus. The programming mode is implemented by the flash programmer circuit to provide the firmware to the external flash memory. The programming mode can also be used by the programming application to provide the firmware to the flash programmer circuit in the correct and expected format. Example programming modes can include, but are not limited to, Serial Peripheral Interface (SPI) programming mode and Byte Peripheral Interface (BPI) programming mode.

SPI type flash memory uses a serial type interface. SPI Flash uses this interface to provide direct access to memory addresses and, in some embodiments, uses a 4-pin interface to configure the programmable IC. BPI type flash memory uses a parallel type interface. BPI type flash, having a parallel interface, uses more pins than SPI flash and is faster than SPI.

In block 408, the processor opens the firmware file. In order to program a flash memory, a file is generated that includes the data to be stored in the flash memory. In the example of FIG. 4, the firmware file stores firmware data for the programmable IC. The firmware data, for example, can be a configuration bitstream or a partial configuration bitstream.

The programming application, as executed by the processor, is capable of reading and interpreting the firmware file for providing the firmware data to the flash programmer circuit for storage in the external flash memory and also for reading data written to the external flash memory back and comparing to the firmware data in the firmware file for verification.

In block 410, the processor reads a portion of the firmware file. In general, when programming a flash memory, a file specifying the data to be stored in the flash memory is used. In accordance with one or more embodiments described herein, the firmware file includes firmware data specified in a generalized manner that is not specific to any particular programming mode. In one or more other embodiments, the firmware file includes firmware data formatted for a particular programming mode. In either case, the processor is capable of reading a portion of firmware data from the firmware file and translating the portion of firmware data into the particular format that is compatible with the determined programming mode.

In block 412, the processor writes the portion of firmware data read in block 410 to an input buffer of the flash programmer circuit in the programmable IC. The processor sends the portion of the firmware data to the programmer circuit over the communication bus. As discussed, the portion of firmware data is provided in a format that corresponds to the programming mode used by the flash programmer circuit to program the external flash memory.

In block 414, the processor determines whether the input buffer of the flash programmer circuit is full (e.g., at a predetermined capacity). The flash programmer circuit, for example, can provide a signal through the communication bus indicating when the input buffer has reached the predetermined capacity. In response to determining that the input buffer of the flash programmer circuit is full, method 400 continues to block 416. In response to determining that the input buffer of the flash programmer circuit is not full, method 400 loops back to block 410 to read another portion of the firmware data and continue writing to the input buffer.

In block 416, the processor sends a write enable command to the flash programmer circuit. The processor further sends a write address to the flash programmer circuit specifying the address or segment of the flash memory to which the firmware data stored in the input buffer is to be written.

In block 418, the flash programmer circuit transfers the firmware data from the input buffer to the flash memory. In one or more embodiments, the flash programmer circuit implements a state machine that is preconfigured to interact with the particular type of external flash memory located on the accelerator card. For example, the external flash memory often includes a state machine therein that handles read operations and write operations internally within the flash memory. The state machine is capable of providing indications to the flash programmer circuit that data has been successfully written and/or outputting data as the result of a read operation. The state machine implemented within the flash programmer circuit is specifically tailored to interact with the state machine implemented within the flash memory to effectuate reads and/or writes of the external flash memory to store the firmware data from the computer within the external flash memory.

In block 420, the flash programmer circuit determines whether the input buffer is empty. In response to determining that the input buffer is not empty, method 400 loops back to block 418 to continue transferring further firmware data from the input buffer to the external flash memory. In response to determining that the input buffer is empty, method 400 continues to block 422.

In block 422, the flash programmer circuit determines whether the end of the firmware file is reached within the input buffer. In response to determining that the end of the firmware file was reached, e.g., the last portion of data from the firmware file was stored in the input buffer and transferred to the external flash memory, method 400 ends. In response to determining that the end of the firmware file was not reached, method 400 loops back to block 410 to continue filling the input buffer of the flash programmer circuit with further firmware data.

As an illustrative and nonlimiting example, consider the case where the firmware file is implemented as an MCS file. The MCS file, which has the contents that are to be transferred to the external flash memory, has various sections.

These sections generally include the Input Data Record, the End of File Record, the Extended Segment Address Record, and the Extended Linear Address Record. The programming application is capable of performing an initial preprocessing loop on the MCS file to store the offsets and/or sizes of the various data records that are to be transferred to the external flash memory, the size of the file, and whether extended addressing is needed.

The programming application is also capable of indexing against the firmware data in the MCS file differently depending on the programming mode and, as such, the type of external flash memory used on the accelerator card. In the case of an SPI type of flash memory, the programming application is capable of reading a line of the MCS file and writing the line to the input buffer of the flash programmer circuit. This operation triggers the flash programmer circuit's internal state machine to write to the external flash memory via the determined programming mode. The programming application is capable of waiting until a ready bit is read from the flash programmer circuit and continue to loop until the MCS file is completely processed. In one or more embodiments, because the particular type of external flash memory is known on the accelerator card, the flash programmer circuit can be configured to use more efficient programming techniques such as the QUAD programming mode when supported.

The example embodiments described herein are capable of updating firmware for a programmable IC significantly faster than conventional techniques. For example, using the techniques as described herein, firmware for a programmable IC can be updated approximately 10 times faster than using JTAG, which does not account for the manual requirement of plugging in a cable to each accelerator card.

Figure 5:
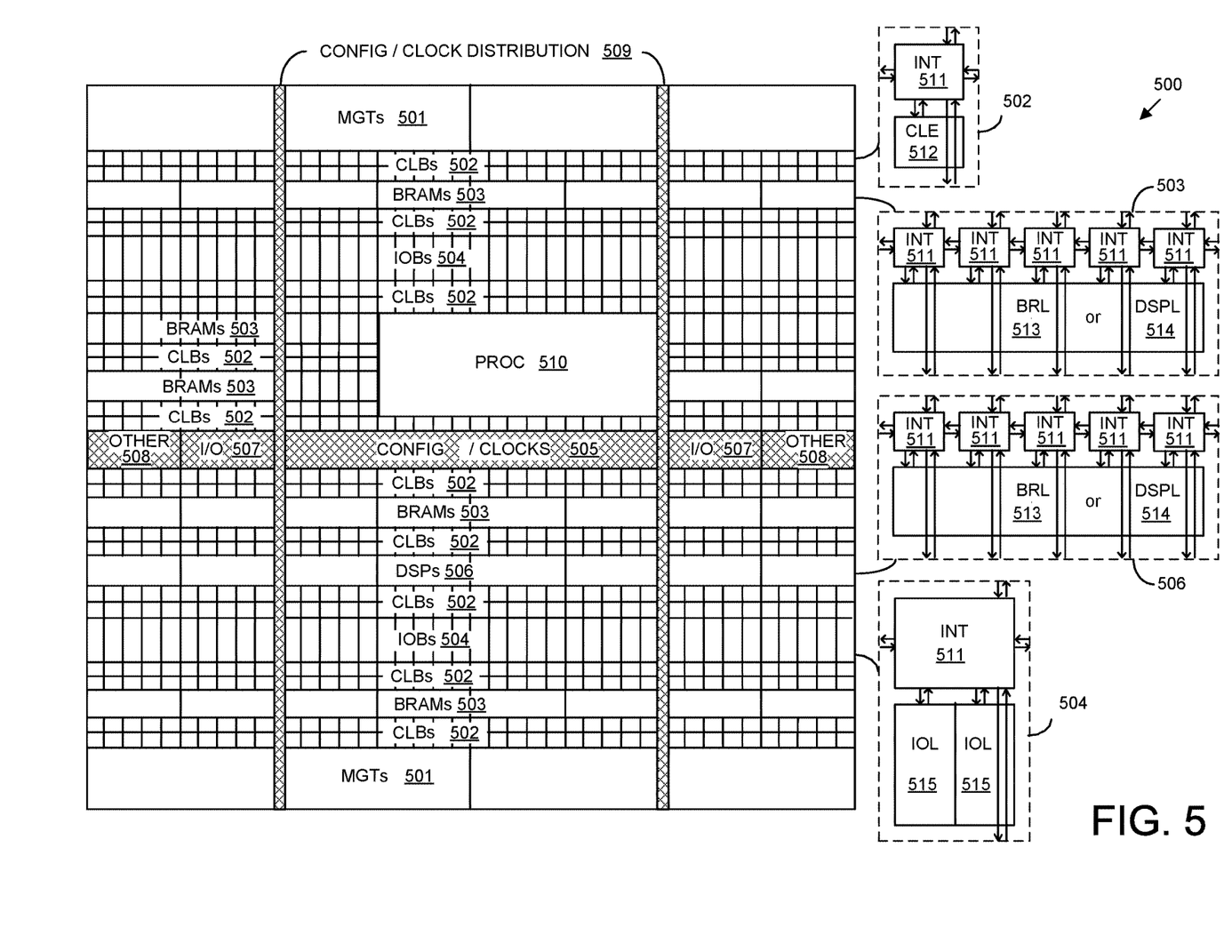
FIG. 5 illustrates an example architecture for a programmable IC.

FIG. 5 illustrates an example architecture 500 for an IC. In one aspect, architecture 500 may be implemented within a programmable IC. For example, architecture 500 may be used to implement a field programmable gate array (FPGA). Architecture 500 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 500 includes several different types of programmable circuit, e.g., logic, blocks. For example, architecture 500 may include a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized I/O blocks 507 (e.g., configuration ports and clock ports), and other programmable logic 508 such as digital clock managers, analog-to-digital converters, system monitoring logic, and so forth.

In some ICs, each programmable tile includes a programmable interconnect element (INT) 511 having standardized connections to and from a corresponding INT 511 in each adjacent tile. Therefore, INTs 511, taken together, implement the programmable interconnect structure for the illustrated IC. Each INT 511 also includes the connections to and from the programmable logic element within the same tile, as shown by the examples included at the top of FIG. 5.

For example, a CLB 502 may include a configurable logic element (CLE) 512 that may be programmed to implement user logic plus a single INT 511. A BRAM 503 may include a BRAM logic element (BRL) 513 in addition to one or more INTs 511. Typically, the number of INTs 511 included in a tile depends on the height of the tile. As pictured, a BRAM tile has the same height as five CLBs, but other numbers (e.g., four) also may be used. A DSP tile 506 may include a DSP logic element (DSPL) 514 in addition to an appropriate number of INTs 511. An IOB 504 may include, for example, two instances of an I/O logic element (IOL) 515 in addition to one instance of an INT 511. The actual I/O pads connected to IOL 515 may not be confined to the area of IOL 515.

In the example pictured in FIG. 5, a columnar area near the center of the die, e.g., formed of regions 505, 507, and 508, may be used for configuration, clock, and other control logic. Horizontal areas 509 extending from this column may be used to distribute the clocks and configuration signals across the breadth of the programmable IC.

Some ICs utilizing the architecture illustrated in FIG. 5 include additional logic blocks that disrupt the regular columnar structure making up a large part of the IC. The additional logic blocks may be programmable blocks and/or dedicated circuitry. For example, a processor block depicted as PROC 510 spans several columns of CLBs and BRAMs.

In one aspect, PROC 510 may be implemented as dedicated circuitry, e.g., as a hardwired processor, that is fabricated as part of the die that implements the programmable circuitry of the IC. PROC 510 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 510 may be omitted from architecture 500 and replaced with one or more of the other varieties of the programmable blocks described. Further, such blocks may be utilized to form a "soft processor" in that the various blocks of programmable circuitry may be used to form a processor that can execute program code as is the case with PROC 510.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 5 that are external to PROC 510 such as CLBs 502 and BRAMs 503 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 510.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 510 or a soft processor. In some cases, architecture 500 includes a dedicated configuration processor that loads the configuration bitstream to the appropriate configuration memory and/or processor memory. The dedicated configuration processor does not execute user-specified program code. In other cases, architecture 500 may utilize PROC 510 to receive the configuration bitstream, load the configuration bitstream into appropriate configuration memory, and/or extract program code for execution.

FIG. 5 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 5 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 510 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method can include determining, using a processor of a computer, a base address register of an accelerator card from a device data file, wherein the accelerator card includes a programmable integrated circuit and is connected to the computer via a communication bus, mapping, using the processor, a feature programmable read only memory (PROM) and a flash programmer circuit, both implemented within the programmable integrated circuit, to local memory of the computer using the base address register, reading, using the processor and over the communication bus, the feature PROM on the programmable integrated circuit to determine a programming mode for programming an external flash memory coupled to the flash programmer circuit, and providing, based on the programming mode and using the processor, firmware to the flash programmer circuit on the programmable integrated circuit via the communication bus. The flash programmer circuit can be configured to program the firmware into the external flash memory.

In one aspect, the firmware, when loaded into the programmable integrated circuit, updates circuits implemented within programmable circuitry of the programmable integrated circuit.

In another aspect, the firmware specifies a configuration bitstream that implements platform circuitry within the programmable integrated circuit.

In another aspect, the device data file is a sysfs file.

In another aspect, the reading the feature PROM and the providing firmware to the flash programmer circuit are performed by memory mapping over the communication bus without a driver for the accelerator card or the programmable integrated circuit.

In another aspect, the mapping creates a mapped region in the local memory in user space of the computer that correlates to addresses of the feature programmable PROM and the flash programmer circuit.

In another aspect, the firmware is stored in a memory of the computer in an MCS file, an EXO file, or an ISC file.

In another aspect, the communication bus is a Peripheral Component Interconnect Express (PCIe) bus.

In one or more embodiments, a system includes a processor configured to initiate operations. The operations can include determining a base address register of an accelerator card from a device data file, wherein the accelerator card includes a programmable integrated circuit, mapping a feature PROM and a flash programmer circuit, both implemented within the programmable integrated circuit, on a communication bus using the base address register, reading, over the communication bus, the feature PROM on the programmable integrated circuit to determine a programming mode for programming an external flash memory coupled to the flash programmer circuit, and providing, based on the programming mode, firmware to the flash programmer circuit on the programmable integrated circuit via the communication bus. The flash programmer circuit can be configured to program the firmware into the external flash memory.

In one aspect, the firmware, when loaded into the programmable integrated circuit, updates circuits implemented within programmable circuitry of the programmable integrated circuit.

In another aspect, the firmware specifies a configuration bitstream that implements platform circuitry within the programmable integrated circuit.

In another aspect, the device data file is a sysfs file.

In another aspect, the reading the feature PROM and the providing firmware to the flash programmer circuit are performed by memory mapping over the communication bus without a driver for the accelerator card or the programmable integrated circuit.

In another aspect, the mapping creates a mapped region in local memory in user space of a computer including the processor, wherein the mapped region correlates to addresses of the feature programmable PROM and the flash programmer circuit.

In another aspect, the firmware is stored in a memory of a computer in MCS file, an EXO file, or an ISC file.

In another aspect, the communication bus is a Peripheral Component Interconnect Express (PCIe) bus.

In one or more embodiments, an integrated circuit includes a feature PROM configured to store a programming mode for writing firmware to an external flash memory and a flash programmer circuit configured to receive the firmware from a computer and write the firmware to the external flash memory.

In one aspect, the flash programmer circuit is configured to implement a state machine for programming the external flash memory.

In another aspect, the flash programmer circuit is configured to receive the firmware from a computer based on the programming mode.

In another aspect, the firmware specifies a configuration bitstream for updating circuits within programmable circuitry of the integrated circuit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   determining, using a processor of a computer, a base address register of an accelerator card from a device data file stored in a memory of the computer;
   wherein the accelerator card includes a programmable integrated circuit and a flash memory external to the programmable integrated circuit, the accelerator card is connected to the computer via a communication bus, and the memory of the computer includes a local memory;
   mapping, using the processor, a feature programmable read only memory (PROM) and a flash programmer circuit, both implemented within the programmable integrated circuit, to a region of the local memory of the computer using the base address register of the accelerator card;
   reading, using the processor and over the communication bus, the feature PROM on the programmable integrated circuit to determine a programming mode for programming the flash memory, wherein the flash memory is coupled to the flash programmer circuit; and
   providing, based on the programming mode and using the processor, firmware from the computer to the flash programmer circuit on the programmable integrated circuit via the communication bus, wherein the firmware is provided in a format corresponding to the programming mode;
   wherein the flash programmer circuit is configured to program the firmware into the flash memory using the programming mode.

2. The method of claim 1, wherein the firmware, when loaded into the programmable integrated circuit, updates circuits implemented within programmable circuitry of the programmable integrated circuit.

3. The method of claim 1, wherein the firmware specifies a configuration bitstream that implements platform circuitry within the programmable integrated circuit.

4. The method of claim 1, wherein the device data file is a sysfs file.

5. The method of claim 1, wherein the reading the feature PROM and the providing firmware to the flash programmer circuit are performed by memory mapping over the communication bus without a driver for the accelerator card or the programmable integrated circuit.

6. The method of claim 1, wherein the region of the local memory is in user space of the computer and correlates to addresses of the feature PROM and the flash programmer circuit.

7. The method of claim 1, wherein the firmware is stored in the memory of the computer in an MCS file, an EXO file, or an ISC file.

8. The method of claim 1, wherein the communication bus is a Peripheral Component Interconnect Express (PCIe) bus.

9. A system, comprising:
a processor configured to initiate operations including:
determining a base address register of an accelerator card from a device data file stored in a memory of the system;
wherein the accelerator card includes a programmable integrated circuit and a flash memory external to the programmable integrated circuit, the accelerator card is connected to the system via a communication bus, and the memory of the system includes a local memory;
mapping a feature programmable read only memory (PROM) and a flash programmer circuit, both implemented within the programmable integrated circuit, to a region of the local memory of the system using the base address register of the accelerator card;
reading, over the communication bus, the feature PROM on the programmable integrated circuit to determine a programming mode for programming the flash memory, wherein the flash memory is coupled to the flash programmer circuit; and
providing, based on the programming mode, firmware from the system to the flash programmer circuit on the programmable integrated circuit via the communication bus, wherein the firmware is provided in a format corresponding to the programming mode;
wherein the flash programmer circuit is configured to program the firmware into the flash memory using the programming mode.

10. The system of claim 9, wherein the firmware, when loaded into the programmable integrated circuit, updates circuits implemented within programmable circuitry of the programmable integrated circuit.

11. The system of claim 9, wherein the firmware specifies a configuration bitstream that implements platform circuitry within the programmable integrated circuit.

12. The system of claim 9, wherein the device data file is a sysfs file.

13. The system of claim 9, wherein the reading the feature PROM and the providing firmware to the flash programmer circuit are performed by memory mapping over the communication bus without a driver for the accelerator card or the programmable integrated circuit.

14. The system of claim 9, wherein the region of the local memory is in user space of the system and correlates to addresses of the feature PROM and the flash programmer circuit.

15. The system of claim 9, wherein the firmware is stored in the memory of the system in an MCS file, an EXO file, or an ISC file.

16. The system of claim 9, wherein the communication bus is a Peripheral Component Interconnect Express (PCIe) bus.

* * * * *